July 10, 1951      L. N. NICCOLLS      2,559,987
GROOVE CUTTING OR INLETTING TOOL
Filed May 27, 1949
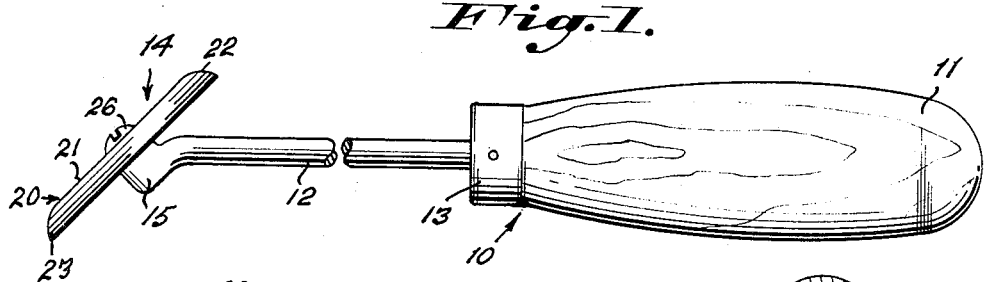
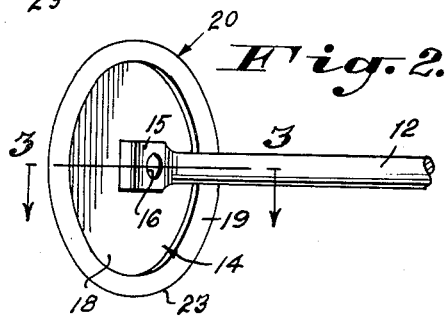
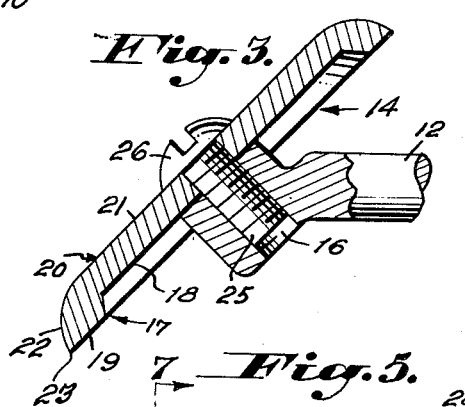
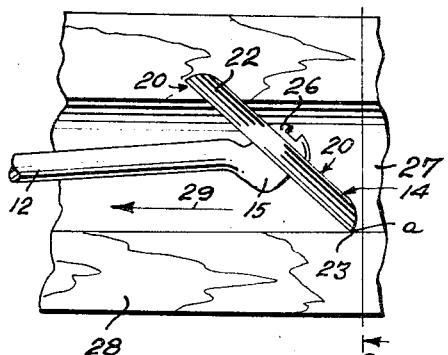
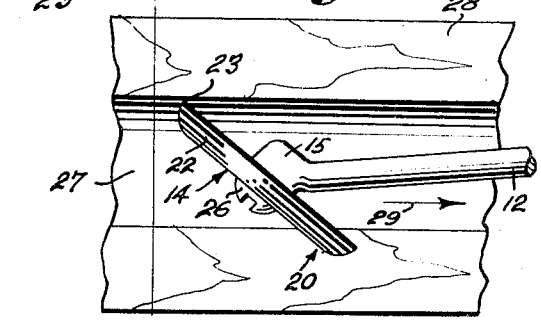
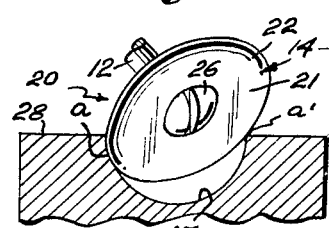
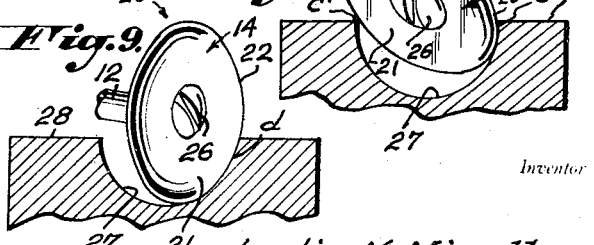
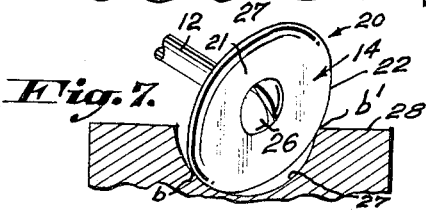
Inventor
Leslie N. Niccolls
By John N. Randolph
Attorney Patented July 10, 1951

2,559,987

UNITED STATES PATENT OFFICE 2,559,987

GROOVE CUTTING OR INLETTING TOOL

Leslie N. Niccolls, Eugene, Oreg.

Application May 27, 1949, Serial No. 95,721

2 Claims. (Cl. 30—314)

This invention relates to a tool for cutting grooves by hand in a workpiece and which is intended or adapted for use on wood, metal, or any other material capable of being cut by a manually actuated cutting blade and which is well adapted as a babbitt scraper in the fitting of babbitt bearing shafts but which is primarily intended and adapted for use in the fine hand finishing of gun stocks and similar expert craft work wherever a rounded groove, either straight or tapering is to be very closely and accurately cut either for ornamentation or inletted to receive another object, such as a gun barrel.

A primary object of the present invention is to provide a tool which can be very accurately operated to minimize the danger of cutting a groove too deep and which may even be employed, if correctly operated for inletting a gun stock to receive a barrel of octagon shape in cross section.

While the cutting tool is primarily intended as a fine finishing tool, it is capable of use for removing large and heavy cuts in commencing a groove or inlet.

More particularly, it is a primary object of the present invention to provide a cutting tool the blade of which is disposed at an angle to the tool shank and handle and which accordingly can be and will be readily applied at an angle to a groove being cut thereby resulting in the tool removing a curl or shaving from the work with ease and at the exact location that the operator desires to remove the material.

A further object of the invention is to provide a tool which, due to the angular disposition of the blade or cutting edge will be located at all times so that the user can readily see the location and depth of the cut being made thereby.

A further object of the invention is to provide a tool which, due to the shape of the cutting head or blade thereof and its disposition with respect to the tool handle and shank will result in a portion of the blade, which is not sharpened to form a cutting edge, being disposed substantially at all times in engagement with a portion of the groove for guiding the blade or cutting head so that another portion thereof may accurately execute the cutting operation.

Still another object of the invention is to provide a tool capable of being made in various sizes and having blades of different sizes, any one of which blades or heads is capable of cutting a groove within a relatively large range of widths or depths.

Still a further object of the invention is to provide a tool having a cutting head or blade provided with a circular cutting edge, all portions of which may be utilized, by turning the head or blade relatively to the tool shank for minimizing the amount of re-sharpening which will be required and which is so constructed that it may be readily re-sharpened and with the minimum of metal being removed therefrom.

Various other objects and advantages of the invention will hereinafter become more fully apparent from the following description of the drawing, illustrating a presently preferred embodiment of the tool, and wherein:

Figure 1 is a fragmentary plan view showing the tool in one position which it may assume when in use;

Figure 2 is a fragmentary plan view of a portion of the tool, including the tool head or blade and taken at approximately a 90° angle to Figure 1;

Figure 3 is an enlarged sectional view taken substantially along a plane as indicated by the line 3—3 of Figure 2;

Figures 4 and 5 are fragmentary plan views showing two positions of the tool head or blade when in use;

Figure 6 is an end elevational view, partly in section taken substantially along a plane as indicated by the line 6—6 of Figure 4;

Figure 7 is a view similar to Figure 6 but taken substantially along a plane as indicated by the line 7—7 of Figure 5, and Figures 8 and 9 are views similar to Figures 6 and 7 but showing other positions of the tool head or blade, when in use.

Referring more specifically to the drawing, a novel groove cutting or inletting tool in its entirety is designated generally 10 and includes a substantially straight handle or grip 11, an elongated tool shank 12 having one end thereof which is suitably anchored in the handle 11 and longitudinally thereof and which projects from the inner handle end 13, and a cutting head or blade, designated generally 14. The shank 12 may be of any desired length and is provided at its opposite, outer end with an obliquely disposed head portion 15 having a threaded bore 16 extending therethrough and which is disposed at substantially a 45° angle to the axis of the shank 12; however, this angle may vary without affecting the operativeness of the tool 10, as will hereinafter become apparent.

The blade or cutting head 14 is substantially disk-shaped and includes an inner side, designated generally 17, having a recessed central portion 18 of a diameter somewhat less than the overall diameter of the blade 14 and defining an annular substantially flat surface 19 therearound and constituting the outer portion of said inner surface 17. The outer side, designated generally 20, of the cutter head 14 includes a substantially flat central portion 21, of approximately the same diameter as the recessed portion 18 and therearound, said outer surface 20 is provided with a rounded portion 22 which is arcuate and externally convex in cross section. The outer edge of the rounded portion 22 merges with the outer edge of the inner surface 19 and the annular edge defined by the merging portions of the surfaces 19 and 22 constitutes the cutting edge 23 of the blade 14 which is suitably sharpened throughout its circumference. The outer portion of the rounded outer surface 22 has approximately a 10° angle or "rake" back from the cutting edge 23, for a purpose which will hereinafter become apparent. This is accomplished due to the fact that the curvature of the portion 22 is not exactly concentric in cross section and diminishes toward the cutting edge 23 so that the portion adjacent said cutting edge, as clearly illustrated in Figure 3, is substantially straight and disposed at an angle of approximately 80° to the plane of the surface 19 to form the aforementioned angle or "rake" of approximately 10°.

The head or blade 10 is provided with a central opening 24 for receiving the threaded shank 25 of a screw which extends slidably therethrough and which is sized to threadedly engage the bore 16. The screw is provided with a head 26 the flat side of which is adapted to abut against the outer surface 21 when the screw is tightened in the bore 16 for detachably clamping the head 14 to the shank portion 15 and for nonrotatably mounting it thereon. It will thus be readily apparent that the plane of the head 14 and cutting edge 23 is disposed at a right angle to the bore 16 and at approximately a 45° angle to the shank 12 or may be disposed at a greater or lesser angle within a range of five or ten degrees.

The tool 10 is grasped by the handle 11 and held with the blade 14 disposed as seen in Figure 1 or rotated through an arc of substantially 180° to be disposed, as seen in Figure 5 and may also be held in other positions. For cutting a groove 27 in a surface 28 of a workpiece of any suitable material such as wood or metal, the tool head may be disposed in either of the positions of Figures 4 and 6 or the positions of Figures 5 and 7 and may also be disposed in other positions such as illustrated in Figures 8 and 9 and is operated by being drawn in the direction as indicated by the arrows 29 in Figures 4 and 5. Only a relatively small portion of the cutting edge 23 is in a position for executing a cutting operation in the groove 27 at any one time so that the tool 10 ordinarily cuts a relatively narrow shaving or curl, particularly in connection with the fine finishing of a groove; however, in initially commencing the groove the tool 10 is capable of use in cutting a much deeper cut, as for example if Figure 1 were construed as a side elevational view and the tool 10 was then assumed in this position to be in use and with the portion of the cutting edge 23, which is located remote to the handle 11 being in engagement with the surface 22 to initially commence the groove. However, in the fine finishing of a groove, as previously stated, the curl or shaving cut is relatively narrow and in Figures 4 and 6, for example, the blade or head 14 is cutting along one side only of the groove adjacent the area as indicated at $a$ and a portion of the rounded back edge 22 at the point $a'$ is in engagement with another portion of the groove 27 to provide a guide for the cutting head 14 during the cutting operation. It will be readily apparent that there will be no cutting of the groove at the point $a'$. In Figure 7 the blade 14 is shown cutting a portion of the groove 27 near the bottom thereof and adjacent the area designated $b$ and a circumferentially spaced portion of its rounded edge 22 is engaging another portion of the groove 27 at the point $b'$ for guiding the head. In Figure 8, the cutting edge 23 is shown executing a cutting stroke along the opposite side wall of the groove 27 at the area designated $c$ and the tool is guided by a portion of the rounded back surface engaging the groove 27 at the point $c'$. In Figure 9 the blade or head 14 is shown in another position of use, similar to that of Figure 7 but wherein the blade is executing a cutting stroke along the groove portion $d$ and without another portion of the blade being in contact with the groove for guiding the blade. It will thus be readily apparent that the blade or cutting head 14 may be accurately and conveniently utilized for fine finishing of a groove or for executing a relatively deep cut therein and as the blade is always pulled toward the operator as indicated by the arrows 29, the cut being executed by the blade or head will at all times be readily visible to the operator to minimize the danger of over cutting.

It will also be readily apparent that the screw 25, 26 may be loosened for turning the blade 14 relatively to the shank 12 so that all portions of the cutting edge 23 may be utilized before it is necessary to re-sharpen the blade 14 and the recessed inner surface 18 enables the blade to be resharpened to a fine edge while grinding off a minimum of the blade.

Various other modifications and changes are contemplated and may obviously be resorted to, without departing from the spirit or scope of the invention as hereinafter defined by the appended claims.

I claim as my invention:

1. A groove cutting or inletting tool comprising an elongated shank having an offset terminal portion provided with a threaded bore disposed at an oblique angle to the axis of the shank, said terminal portion having an outer end surface disposed at a right angle to said bore and at an oblique angle to the axis of the shank through which one end of the bore opens, a disk-shaped blade having a substantially flat inner surface including a recessed central portion disposed in abutting engagement with said outer end surface of the offset terminal, a headed fastening extended centrally through the blade and secured in said threaded bore for securing the blade to the offset terminal and supporting the blade with its plane at an oblique angle to the axis of the shank, the peripheral edge of the flat inner surface of the blade constituting a circular cutting edge, said blade having a flat outer surface disposed parallel to its inner surface and terminating in spaced relationship to the periphery of the blade, and said outer surface of the blade including an annular portion surrounding said flat outer surface and which is convexly arced in cross section, said last mentioned portion being disposed between the cutting edge of the blade and the flat outer surface of the blade and forming a workpiece engaging and guiding surface.

2. A groove cutting or inletting tool comprising an elongated shank having an offset terminal portion provided with a threaded bore disposed at an oblique angle to the axis of the shank, said terminal portion having an outer end surface disposed at a right angle to said bore and at an oblique angle to the axis of the shank through which one end of the bore opens, a disk-shaped blade having a substantially flat inner surface including a central portion disposed in abutting engagement with said outer end surface of the offset terminal, a headed fastening extending centrally through the blade and secured in said threaded bore for securing the blade to the offset terminal and supporting the blade with its plane at an oblique angle to the axis of the shank, the peripheral edge of the flat inner surface of the blade constituting a circular cutting edge, the outer surface of the blade including an annular portion extending back from the cutting edge and which is convexly arced in cross section, said annular portion forming a workpiece engaging and guiding surface for the cutting edge.

LESLIE N. NICCOLLS.

REFERENCES CITED

The following references are of record in the file of this patent:

UNITED STATES PATENTS

| Number | Name | Date |
|---|---|---|
| 478,810 | Nittinger | July 12, 1892 |
| 958,101 | McClellen | May 17, 1910 |
| 1,217,922 | Donnelly | Mar. 6, 1917 |
| 2,318,585 | Abrahamsen | May 11, 1943 |
| 2,534,816 | Hagen | Dec. 19, 1950 |

FOREIGN PATENTS

| Number | Country | Date |
|---|---|---|
| 121,893 | Great Britain | Jan. 9, 1919 |
| 232,968 | Germany | Mar. 29, 1911 |